United States Patent
Lloyd et al.

(10) Patent No.: US 8,938,750 B2
(45) Date of Patent: *Jan. 20, 2015

(54) INTERACTIVE TELEVISION SYSTEM

(75) Inventors: Jeffrey R. Lloyd, Rutland, VT (US); Frank Westcott, Rutland, VT (US)

(73) Assignee: The Partnership of Jeffrey R. Lloyd and Frank Westcott, Rutland, VT (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/430,529

(22) Filed: Mar. 26, 2012

(65) Prior Publication Data

US 2012/0236364 A1 Sep. 20, 2012

Related U.S. Application Data

(63) Continuation of application No. 12/342,574, filed on Dec. 23, 2008, now Pat. No. 8,161,505.

(60) Provisional application No. 61/009,565, filed on Dec. 31, 2007.

(51) Int. Cl.
| | |
|---|---|
| H04N 7/16 | (2011.01) |
| H04N 7/173 | (2011.01) |
| H04N 21/41 | (2011.01) |
| H04N 21/435 | (2011.01) |
| H04N 21/4784 | (2011.01) |
| H04N 21/81 | (2011.01) |

(52) U.S. Cl.
CPC .......... *H04N 7/163* (2013.01); *H04N 21/4117* (2013.01); *H04N 21/435* (2013.01); *H04N 21/4784* (2013.01); *H04N 21/812* (2013.01)
USPC .......... 725/23; 725/2; 725/6; 725/32; 725/106

(58) Field of Classification Search
USPC ....................... 725/2, 6, 23, 32, 106
See application file for complete search history.

(56) References Cited

U.S. PATENT DOCUMENTS

| | | | |
|---|---|---|---|
| 5,703,795 A | 12/1997 | Mankovitz | |
| RE38,600 E | 9/2004 | Mankovitz | |
| 7,729,945 B1 | 6/2010 | Katz | |
| 8,146,126 B2 | 3/2012 | Downey | |
| 8,161,505 B2 * | 4/2012 | Lloyd et al. .................... 725/23 |

* cited by examiner

*Primary Examiner* — Kieu Oanh T Bui
(74) *Attorney, Agent, or Firm* — James Marc Leas

(57) ABSTRACT

A method of providing information to a viewer having a reading device, a television, an input device, and an output device includes transmitting a first digital signal to the reading device. The first digital signal includes information for display on the television. When the reading device receives the first digital signal, the reading device sends a first reading device signal to the television for display to the viewer. The first reading device signal includes information derived from the first digital signal. An output device digital signal is provided to the output device if the viewer sends an input device signal to the reading device by pressing on the input device when the first reading device signal is displayed to the viewer. The output device digital signal includes information for the output device to provide image and/or text related to the information displayed to the viewer.

22 Claims, 7 Drawing Sheets

INTERACTIVE TELEVISION SYSTEM

RELATED PATENT APPLICATIONS AND PRIORITY

This application is a continuation of U.S. patent application Ser. No. 12/342,574, filed Dec. 23, 2008 now U.S. Pat. No. 8,161,505 which claims priority of Provisional Patent Application 61/009,565, filed Dec. 31, 2007, incorporated herein by reference.

FIELD

This patent application generally relates to an interactive television system. More particularly, it relates to a system for distributing useful information to viewers and for receiving information from viewers. Even more particularly, it relates to a system in which viewers can choose to receive printed information.

BACKGROUND

Viewers have long sought ways of avoiding advertisements on TV, such as by changing channels or by recording shows and fast forwarding through commercials. To counter this advertisers have sought ways to maintain viewer interest in their advertisements. In addition advertisers have sought ways to determine the effectiveness of their advertisements. The present applicants recognized a better scheme to maintain viewer interest and to provide information back to advertisers indicating the effectiveness of particular advertisements, and this solution is provided in the following description.

SUMMARY

One aspect of the present patent application is a method of providing information to a viewer having a reading device, a television, an input device, and an output device. The method includes transmitting a first digital signal to the reading device. The first digital signal includes information for display on the television. The method also includes providing the reading device so when the reading device receives the first digital signal, the reading device sends a first reading device signal from the reading device to the television for display to the viewer. The first reading device signal includes information derived from the first digital signal. The method also includes providing an output device digital signal to the output device if the viewer sends an input device signal to the reading device by pressing on the input device when the first reading device signal is displayed to the viewer on the television. The output device digital signal includes information for the output device to provide image and/or text related to the information displayed to the viewer on the television from the first reading device signal.

Another aspect is a computer-usable medium having computer readable instructions stored thereon for execution by a processor corresponding to the above method.

BRIEF DESCRIPTION OF THE DRAWINGS

The foregoing will be apparent from the following detailed description, as illustrated in the accompanying drawings, in which.

DETAILED DESCRIPTION

In one embodiment, the present applicants provide an interactive television system that allows a viewer to choose to print information related to an advertisement broadcast on television. The printed information can include coupons, recipes, prize certificates, or other printed attractions. In one embodiment, the interested viewer presses the select button on a remote control device to initiate the printing. In a further embodiment, the fact that the viewer pressed the select button to receive the printed information is stored for transmission back to the advertiser. Associated information, such as the particular advertisement, the advertiser, the name of the television show being watched, the date, and the time, is also stored for transmission back to the advertiser. In another embodiment, this associated information is printed on the coupon. The associated information may be printed on the coupon as a code, such as a bar code. When the customer uses the coupon to purchase the advertised product or service, the information on the bar code is retrieved for transmission to the advertiser. Thus, the advertiser gets feedback showing the success of the particular advertisement.

Figure 1:
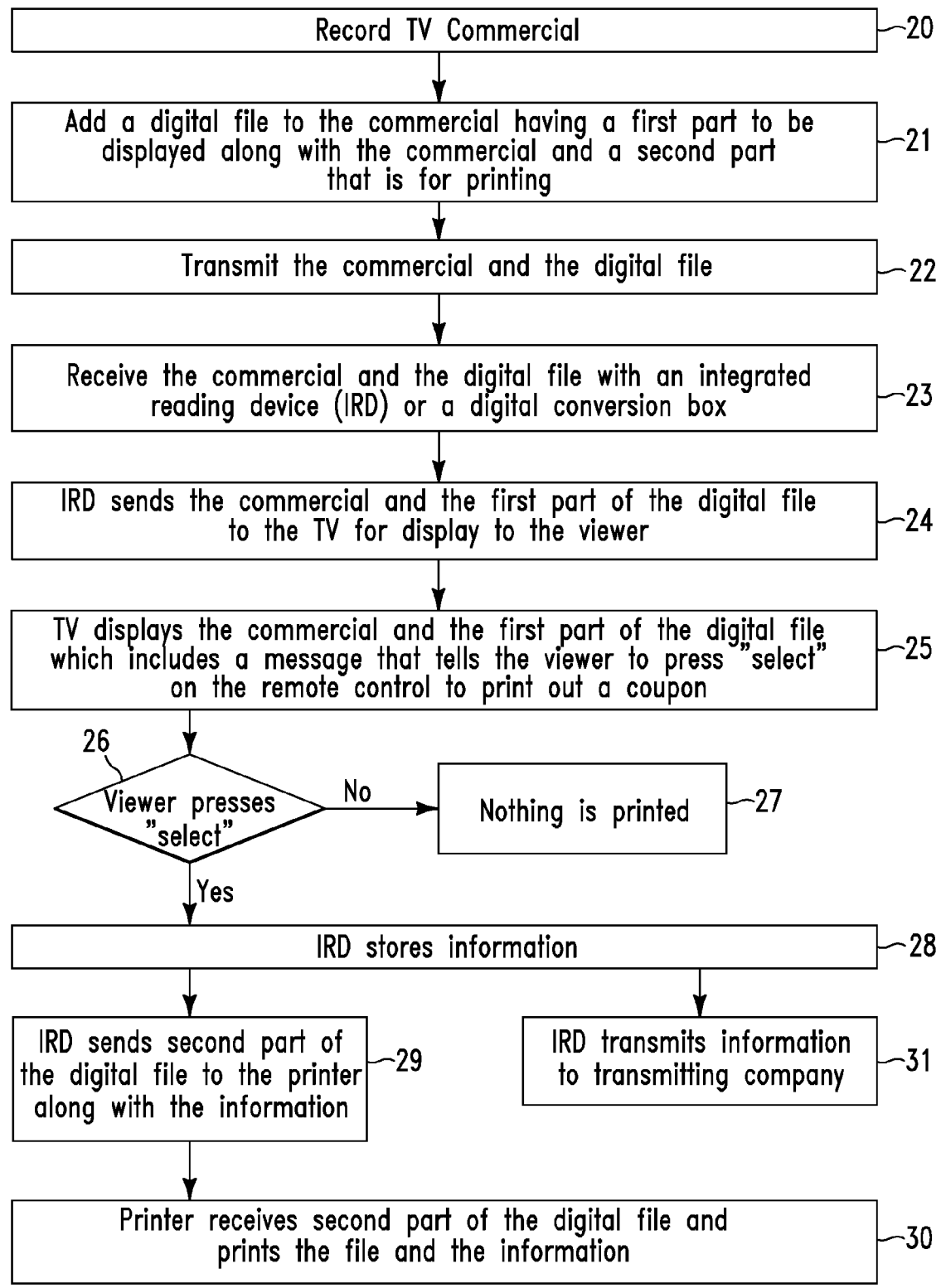
FIG. 1 is a flow chart illustrating a process that allows a viewer to choose to print information related to an advertisement broadcast on television.
Figure 2:
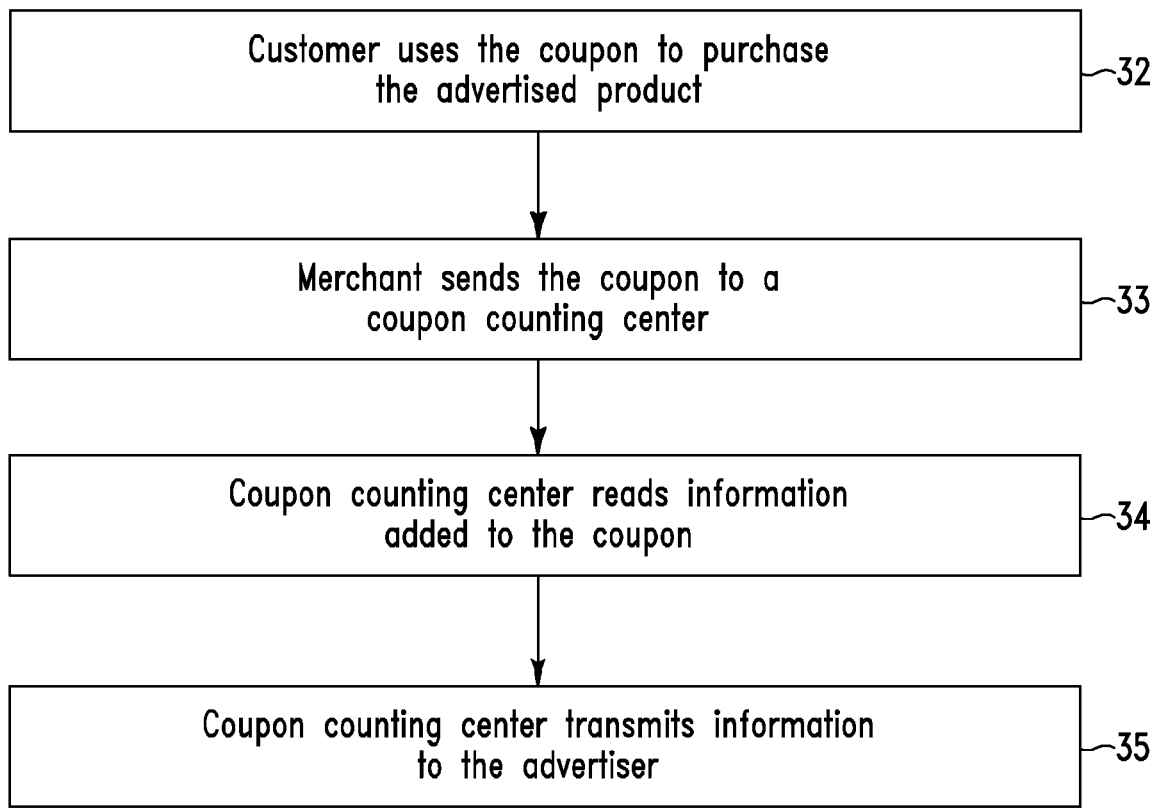
FIG. 2 is a flow chart illustrating a process in which a customer uses a coupon printed out according to the process of FIG. 1.
Figure 3A:
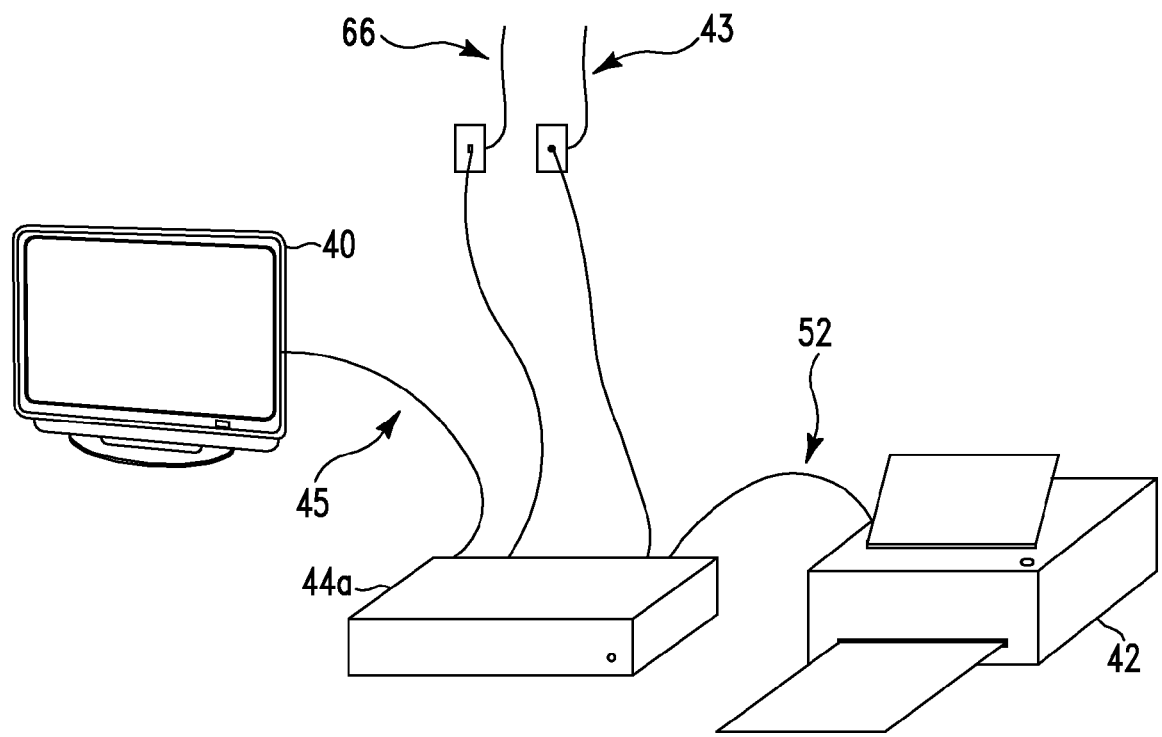
FIG. 3*a* illustrates an embodiment in which a reading device is connected to a source of transmitted television signal, a television, a printer, and a phone line.

Various embodiments of the present system are illustrated in the flow charts of FIGS. 1 and 2. In one embodiment, a television advertisement, or a "commercial," is recorded in a television studio, as shown in box 20 of FIG. 1. A digital file is included with the advertisement. This digital file has a first part to be displayed along with the advertisement on television 40, as shown in FIG. 3*a*. The digital file has a second part that is for printing on printer 42, as shown in box 21. The advertisement and the digital file are transmitted by the source of television transmission to television viewers over cable 43, as shown in box 22. Satellite or airwaves transmission can also be used.

Figure 3B:
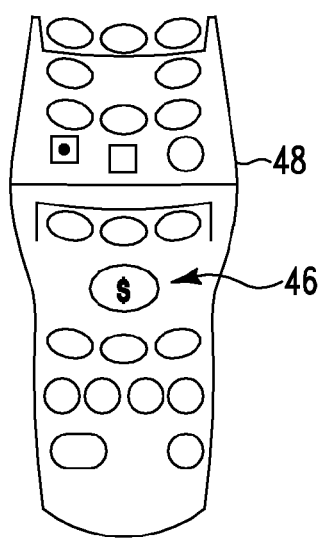
FIG. 3*b* illustrates a remote control for controlling the system of FIG. 3*a*, including a select button for initiating printing information related to an advertisement.

A viewer receives the advertisement and the digital file with reading device 44*a*, such as an integrated reading device (IRD) or any other digital conversion box, as shown in box 23. Reading device 44*a* sends the advertisement and the first part of the digital file to television 40 over connector 45 for audio and visual display to the viewer, as shown in box 24. Television 40 displays the advertisement and the first part of the digital file, as shown in box 25. In this embodiment, the display of the first part of the digital file includes a message that tells the viewer to press "select" button 46 on remote control 48, as shown in FIG. 3*b*, if he or she wishes to print out a coupon. Any other button on remote control 48 can be assigned for this task or a special print button can be designated. The message on the television display may be in the form of a recognizable icon. It may also have a text message, such as "press select to print $1.00 off coupon."

The viewer has the choice as to whether or not to press "select" button 46 on remote control 48, as shown in box 26. If the viewer does not press "select" button 46 nothing is printed, as shown in box 27. If the viewer presses "select," reading device 44a stores associated information, as shown in box 28, and sends the second part of the digital file to printer 42, as shown in box 29. The second part of the digital file includes the digital code for the coupon. This code may provide image or text.

Figure 4A:
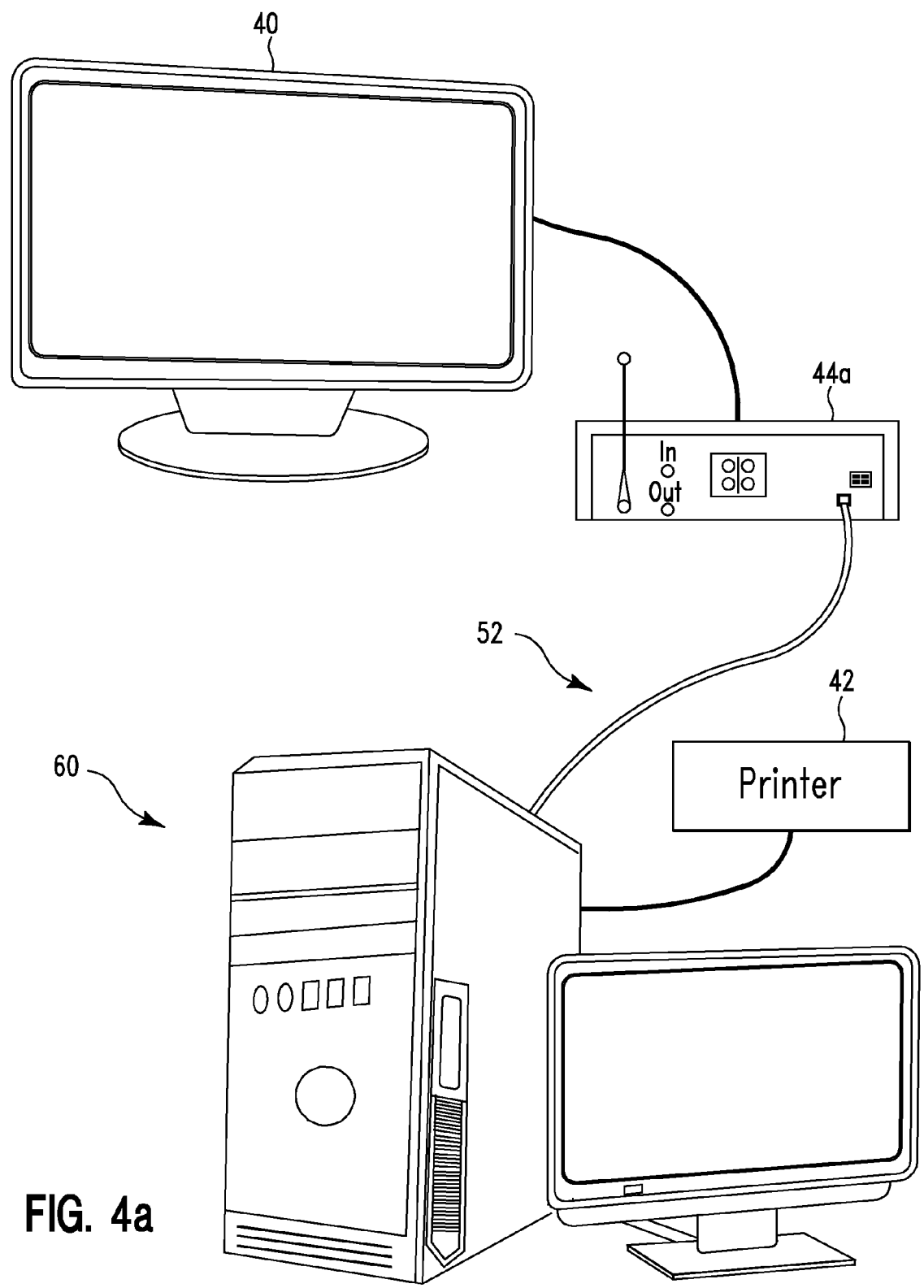
FIG. 4*a* illustrates an embodiment in which a reading device is connected to a television and a computer, and the reading device is wire-connected to the computer.
Figure 4B:
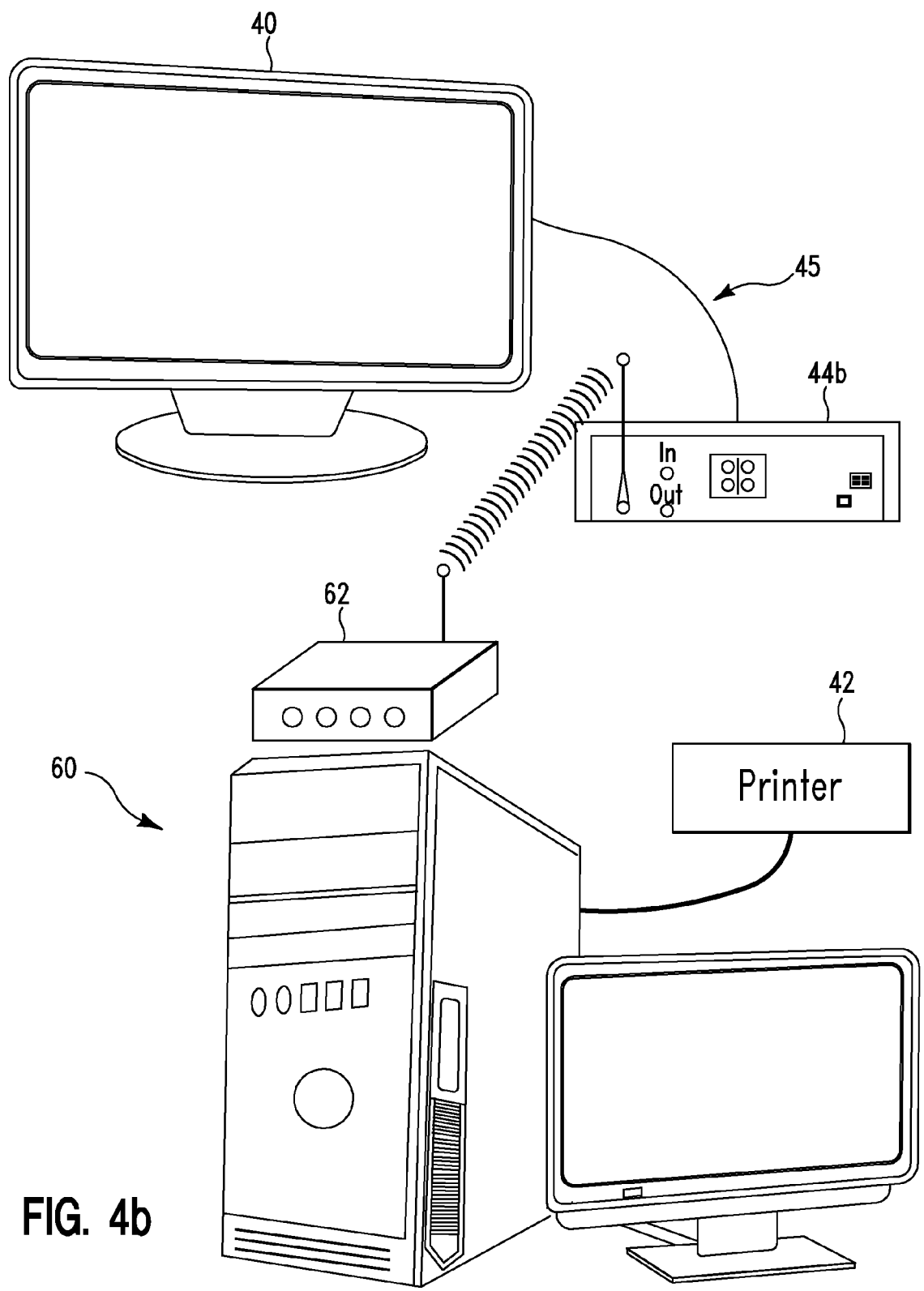
FIG. 4*b* illustrates an embodiment similar to the embodiment of FIG. 4*a* except the reading device is wirelessly connected to the computer.
Figure 5A:
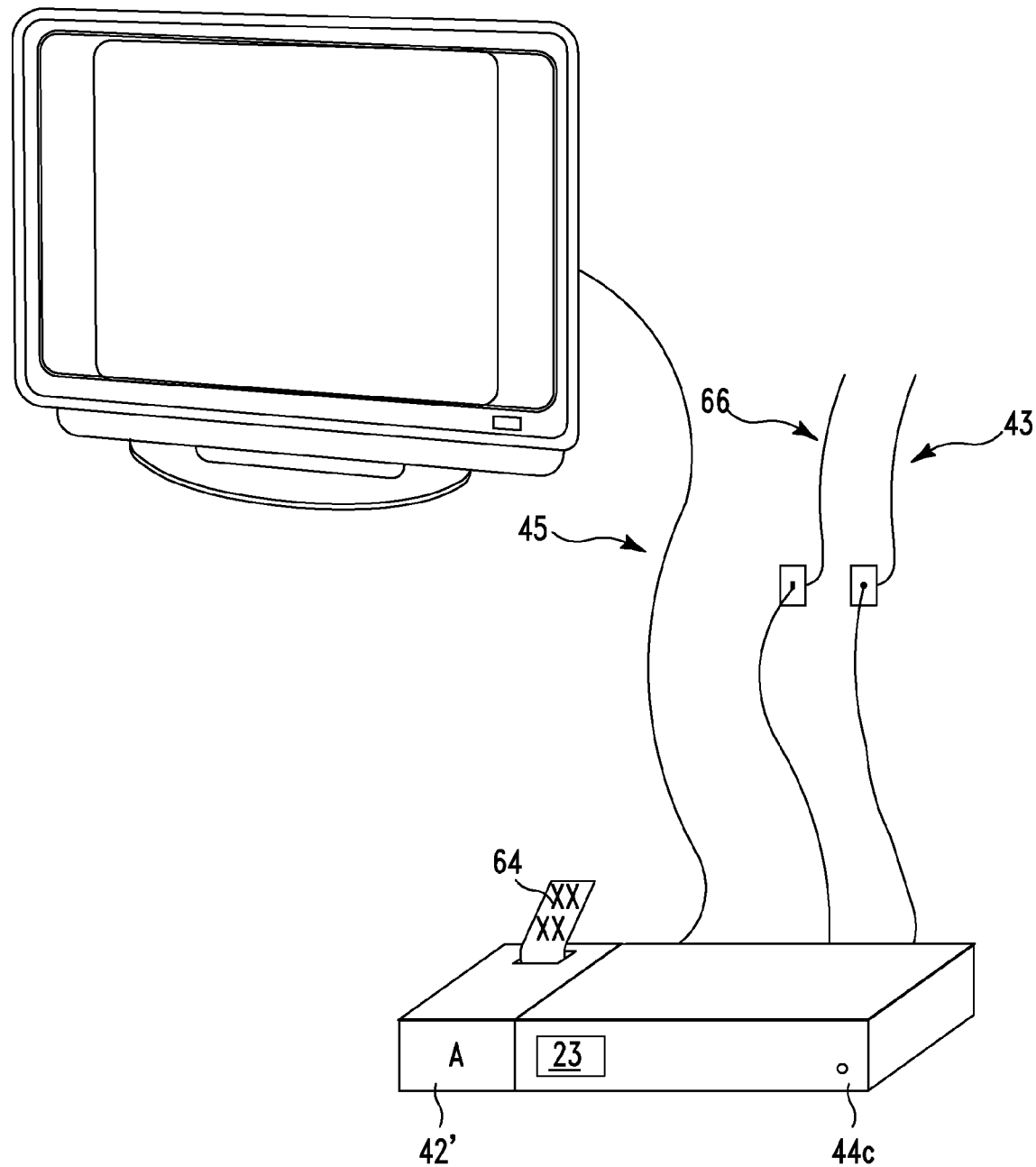
FIG. 5*a* illustrates an embodiment similar to the embodiment of FIG. 3 except the reading device includes the printer.
Figure 5B:
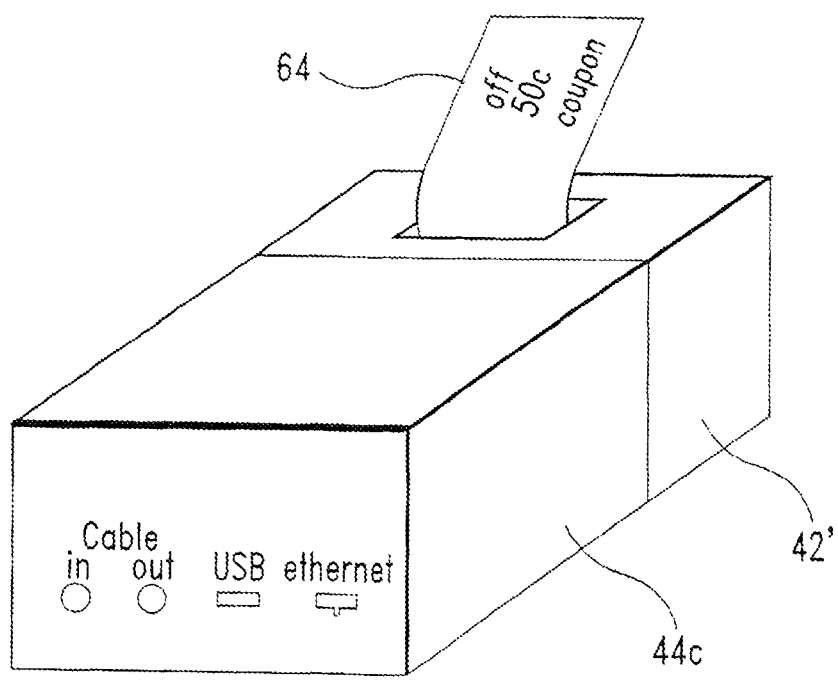
FIG. 5*b* illustrates an enlarged view of the reading device of FIG. 5*a* and its printer.

Connection to printer 42a may be by way of cable 52, such as an ethernet or USB cable, as shown in FIG. 3a. In this embodiment printer 42 is directly connected to reading device 44a. Alternatively, reading device 44a, 44b and computer 60 may be members of a wired or wireless network, as shown in FIGS. 4a, 4b, while printer 42 is connected to computer 60. The wireless network includes reading device 44b wirelessly communicating with computer 60 through wireless router 62. In another embodiment, printer 42' is integrated in one box with reading device 44c, as shown in FIGS. 5a, 5b. In another embodiment, the reading device is integrated in one unit with the television (not shown).

Printer 42, 42' receives the second part of the digital file and prints coupon 64 along with the associated information, as shown in box 30.

At the same time coupon 64 is printed, or at another time, reading device 44a, 44b, 44c transmits the advertisement information and the associated information to the cable, satellite, or broadcast company or to another company designated for receiving such information, as shown in box 31. In one embodiment, reading device 44a, 44b, 44c has a modem (not shown) and transmits the associated information with telephone line 66. Other transmission schemes can be used, such as through an internet connection. Transmission of the advertisement information and the associated information may be on a schedule, such as once per day or it can be after each coupon or several coupons have been printed by the viewer.

The viewer who printed out coupon 64 can now use coupon 64 to purchase the advertised product or service, as shown in box 32 of FIG. 2. In one embodiment, the merchant receiving coupon 64 sends coupon 64 to a coupon counting center, as shown in box 33. The coupon counting center reads the advertisement and associated information printed on coupon 64, as shown in box 34, and transmits that information to the advertiser, as shown in box 35. Thus, the viewer receives the benefit of coupon 64 and the advertiser receives information about an advertisement that was effective to produce a purchase.

While the system of the present patent application has been described in terms of television advertisements and coupons, it is also useful for other television applications that involve the choice of printing material that may be described during a television program or during an advertisement, such as travel brochures, instructions, cooking recipes, political platforms, posters, flyers, and educational materials. For some of these applications, storage of associated information and feedback to the provider may be included and for others these features may be omitted. Other applications include providing forms for printing, for example for polling viewers. For children's programs, cartoons, games, and coloring pages can be provided for printing. Along with recipes coupons may be provided for certain ingredients. Non coupon related advertising may also be provided for printing, such as phone number, web address, other contact information, product image, and product description. Other applications include providing pictures of celebrities. Other applications allow interaction with the television program through printing out material or certificates for prizes or free samples. For example, shows relating to hunting or fishing may provide a list of useful tips that can be sent to the printer. Similarly, sports programs can provide game schedules, race schedules, participants, and race results for printing. Hobby shows can provide instructions and materials lists for viewers to print so they can acquire the materials before the next show. And gaming shows can provide cheats and codes for printing.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A method of providing information to a viewer having a reading device, a television, an input device, and an output device, comprising:
   a. transmitting a first digital signal to the reading device, wherein said first digital signal includes information for display on the television;
   b. providing the reading device so when the reading device receives the first digital signal the reading device sends a first reading device signal from the reading device to the television for display to the viewer, wherein said first reading device signal includes information derived from said first digital signal;
   c. providing an output device digital signal to the output device if the viewer sends an input device signal to the reading device by pressing on the input device when said first reading device signal is displayed to the viewer on the television, wherein said output device digital signal includes information for said output device to provide at least one from the group consisting of image and text related to said information displayed to the viewer on the television from said first reading device signal.

2. The method as recited in claim 1, wherein said providing said output device digital signal to the output device is over at least one from the group consisting of a wired and a wireless connection.

3. The method as recited in claim 1, further comprising transmitting a second digital signal to the reading device, wherein said second digital signal includes information for said output device digital signal.

4. The method as recited in claim 3, wherein said first digital signal and said second digital signal are transmitted together.

5. The method as recited in claim 3, wherein the reading device is at least one from the group consisting of directly connected to the output device, a member of a wired or wireless network that communicates with the output device, and integrated in one box with the output device for communication with the output device.

6. The method as recited in claim 3, further comprising providing the reading device so if the viewer presses on the input device the reading device responds to said pressing by communicating said output device digital signal from the reading device to the output device.

7. The method as recited in claim 6, wherein said providing an output device digital signal precedes said pressing on the input device.

8. The method as recited in claim 7, wherein said output device digital signal is already available at said reading device when the viewer presses on said input device.

9. The method as recited in claim 1, wherein said output device includes a printer, and printing information derived from said output device digital signal to provide said at least one from the group consisting of image and text.

10. The method as recited in claim 1, wherein said first reading device signal includes a message inviting the viewer to use the input device to receive information.

11. The method as recited in claim 10, wherein said first reading device signal includes a message inviting the viewer to use the input device to print the information.

12. The method as recited in claim 10, further comprising storing information related to at least one from the group consisting of said first reading device signal and said output device digital signal if the viewer uses said input device to receive information.

13. The method as recited in claim 12, further comprising storing information related to at least one from the group consisting of the particular advertisement, the advertiser, the name of television program, date, time.

14. The method as recited in claim 13, further comprising displaying said stored information as a bar code.

15. The method as recited in claim 13, further comprising transmitting said stored information.

16. The method as recited in claim 15, further comprising providing a modem, wherein said transmitting involves using said modem for said transmitting said stored information.

17. The method as recited in claim 1, wherein said first reading device signal includes an advertisement.

18. The method as recited in claim 1, wherein said output digital signal includes at least one from the group consisting of a coupon, a recipe, an instruction, a brochure, a political platform, and educational material.

19. The method as recited in claim 1, wherein said first reading device digital signal includes an advertisement from an advertiser, wherein said output digital signal includes a coupon, wherein said coupon includes coupon information, further comprising using said coupon when purchasing, and further comprising providing said coupon information from said coupon to the advertiser.

20. The method as recited in claim 19, wherein said coupon information includes at least one from the group consisting of name of television program associated with said first digital signal, date of said first digital signal, time of said first digital signal, and receiver identity.

21. The method as recited in claim 1, wherein said input device includes a remote control, wherein pressing on said input device involves pressing a button on said remote control.

22. A computer-usable medium having computer readable instructions stored thereon for execution by a processor to perform a method, comprising:
   a. transmitting a first digital signal to the reading device, wherein said first digital signal includes information for display on the television;
   b. providing the reading device so when the reading device receives the first digital signal the reading device sends a first reading device signal from the reading device to the television for display to the viewer, wherein said first reading device signal includes information derived from said first digital signal;
   c. providing an output device digital signal to the output device if the viewer sends an input device signal to the reading device by pressing on the input device when said first reading device signal is displayed to the viewer on the television, wherein said output device digital signal includes information for said output device to provide at least one from the group consisting of image and text related to said information displayed to the viewer on the television from said first reading device signal.

* * * * *